United States Patent
Heller

(10) Patent No.: US 11,914,022 B2
(45) Date of Patent: Feb. 27, 2024

(54) FAST CHIRP SYNTHESIS VIA SEGMENTED FREQUENCY SHIFTING

(71) Applicant: AyDeeKay LLC, Aliso Viejo, CA (US)

(72) Inventor: Tom Heller, Karmiel (IL)

(73) Assignee: Ay Dee Kay LLC, Aliso Viejo, CA (US)

( * ) Notice: Subject to any disclaimer, the term of this patent is extended or adjusted under 35 U.S.C. 154(b) by 0 days.

(21) Appl. No.: 18/132,409

(22) Filed: Apr. 9, 2023

(65) Prior Publication Data

US 2023/0358876 A1 Nov. 9, 2023

Related U.S. Application Data

(63) Continuation of application No. 17/027,913, filed on Sep. 22, 2020, now Pat. No. 11,709,247.

(51) Int. Cl.
| | |
|---|---|
| *G01S 13/58* | (2006.01) |
| *G01S 13/34* | (2006.01) |
| *G01S 13/534* | (2006.01) |

(52) U.S. Cl.
CPC .......... *G01S 13/584* (2013.01); *G01S 13/343* (2013.01); *G01S 13/534* (2013.01)

(58) Field of Classification Search
CPC ..... G01S 13/584; G01S 13/343; G01S 13/534
USPC .......................................................... 342/175
See application file for complete search history.

(56) References Cited

U.S. PATENT DOCUMENTS

| | | | | |
|---|---|---|---|---|
| 3,715,753 A | * | 2/1973 | Applebaum | G01S 13/36 342/131 |
| 4,815,085 A | * | 3/1989 | Javan | H01S 3/1394 359/333 |
| 4,841,529 A | * | 6/1989 | Javan | G02F 2/002 372/28 |
| 5,289,252 A | * | 2/1994 | Nourrcier | G01S 7/484 356/28.5 |
| 5,428,361 A | * | 6/1995 | Hightower | H03B 23/00 331/107 A |
| 5,557,560 A | * | 9/1996 | Dix | H03B 23/00 708/319 |
| 5,963,163 A | * | 10/1999 | Kemkemian | G01S 13/584 342/111 |
| 6,573,982 B1 | * | 6/2003 | Pruitt | G01S 17/26 342/132 |
| 7,379,652 B2 | * | 5/2008 | Cole | G01J 3/4338 356/402 |
| 7,791,415 B2 | * | 9/2010 | Hornbuckle | H03L 7/1976 331/34 |

(Continued)

FOREIGN PATENT DOCUMENTS

EP 3614170 A1 * 2/2020 ......... G01B 9/02003

*Primary Examiner* — Nuzhat Pervin
(74) *Attorney, Agent, or Firm* — Steven Stupp

(57) ABSTRACT

In an illustrative integrated circuit, a chirp generator provides a chirp signal having linearly-ramped chirp intervals, while a shift frequency generator provides a signal having a different shift frequency during each of multiple segments in each chirp interval. A modulator combines the signals to derive a segmented chirp signal having multiple linearly-ramped chirp segments in each chirp interval. The modulator may be a single sideband modulator to provide frequency up-shifted and frequency down-shifted chirp segments. The segmented chirp signal may be suppressed during resettling intervals of the original chirp signal.

20 Claims, 6 Drawing Sheets

(56) References Cited

U.S. PATENT DOCUMENTS

| | | | | |
|---|---|---|---|---|
| 7,894,725 | B2* | 2/2011 | Holman | H04B 10/508 398/189 |
| 8,750,717 | B1* | 6/2014 | Yap | G02F 2/02 398/163 |
| 8,804,103 | B2* | 8/2014 | Christian | G01S 7/493 356/28 |
| 9,020,360 | B2* | 4/2015 | Stiffler | H04B 10/5165 398/115 |
| 9,112,592 | B2* | 8/2015 | McCorkle | H04L 27/103 |
| 9,853,733 | B2* | 12/2017 | Stiffler | H04B 10/5165 |
| 9,901,252 | B2* | 2/2018 | Tran | A61B 5/02055 |
| 10,330,778 | B2* | 6/2019 | Kaneda | G01S 7/484 |
| 10,938,440 | B2* | 3/2021 | Nguyen | H04B 1/69 |
| 11,162,773 | B2* | 11/2021 | Salvadé | G01S 7/41 |
| 11,362,700 | B2* | 6/2022 | Nguyen | H04B 1/69 |
| 2005/0174279 | A1* | 8/2005 | Voigtlaender | G01S 7/03 342/194 |
| 2007/0063888 | A1* | 3/2007 | Jenkins | G01S 13/106 342/21 |
| 2007/0171407 | A1* | 7/2007 | Cole | G01J 3/4338 356/300 |
| 2007/0216568 | A1* | 9/2007 | Kunert | G01S 13/34 342/107 |
| 2008/0284531 | A1* | 11/2008 | Hornbuckle | H03L 7/1976 331/1 A |
| 2009/0087186 | A1* | 4/2009 | Holman | H04B 10/508 398/102 |
| 2011/0256837 | A1* | 10/2011 | McCorkle | H04B 1/408 455/78 |
| 2012/0002972 | A1* | 1/2012 | Stiffler | H04B 10/5165 398/115 |
| 2012/0314730 | A1* | 12/2012 | McCorkle | H04L 27/103 375/139 |
| 2015/0002332 | A1* | 1/2015 | Bi | G01S 13/02 342/385 |
| 2015/0200727 | A1* | 7/2015 | Stiffler | H04B 10/25759 398/115 |
| 2016/0139259 | A1* | 5/2016 | Rappaport | G01S 13/0209 342/21 |
| 2016/0291131 | A1* | 10/2016 | McAleenan | G01S 7/4008 |
| 2017/0350964 | A1* | 12/2017 | Kaneda | G01S 7/4865 |
| 2018/0156890 | A1* | 6/2018 | Li | G01S 13/931 |
| 2019/0004146 | A1* | 1/2019 | von Rhein | G01S 13/68 |
| 2019/0064358 | A1* | 2/2019 | Desai | G01S 7/4911 |
| 2019/0199334 | A1* | 6/2019 | Chakraborty | H04B 7/0452 |
| 2019/0250246 | A1* | 8/2019 | Murakami | H03D 7/00 |
| 2019/0356351 | A1* | 11/2019 | Nguyen | H04B 1/69 |
| 2020/0064116 | A1* | 2/2020 | Salvadé | G01S 13/505 |
| 2020/0408878 | A1* | 12/2020 | Liang | G01S 7/354 |
| 2021/0024069 | A1* | 1/2021 | Herman | B60W 60/00274 |
| 2021/0111750 | A1* | 4/2021 | Nguyen | H04B 1/69 |
| 2022/0068252 | A1* | 3/2022 | Seagriff | G10K 11/17815 |

* cited by examiner

FAST CHIRP SYNTHESIS VIA SEGMENTED FREQUENCY SHIFTING

BACKGROUND

In the quest for ever-safer and more convenient transportation options, many car manufacturers are developing self-driving cars which require an impressive number and variety of sensors. Among the contemplated sensing technologies are multi-input, multi-output radar systems to monitor the distances between the car and any vehicles or obstacles along the travel path. Such systems may benefit from techniques that enable faster measurement repetition. One such example can be found in co-pending U.S. application Ser. No. 16/196,623, titled "Chirp Sequence Synthesis in a Dynamic Distribution Network" and filed 2019 Nov. 26 by inventors Tom Heller et al.

SUMMARY

Accordingly, there is disclosed herein an illustrative integrated circuit that includes: a chirp generator to provide a chirp signal having linearly-ramped chirp intervals; a shift frequency generator to provide a signal having a different shift frequency during each of multiple segments in each chirp interval; and a modulator to derive a segmented chirp signal from a product of the chirp signal with the shift frequency signal, the segmented chirp signal having multiple linearly-ramped chirp segments in each chirp interval.

An illustrative method includes: generating a chirp signal having linearly-ramped chirp intervals; generating a signal having a different shift frequency during each of multiple segments in each chirp interval; and deriving a segmented chirp signal from a product of the chirp signal with the shift frequency signal, the segmented chirp signal having multiple linearly-ramped chirp segments in each chirp interval.

An illustrative radar device includes: a chirp generator to provide a chirp signal having linearly-ramped chirp intervals; a shift frequency signal generation means; and a modulation means for deriving a segmented chirp signal from a product of the chirp signal with the shift frequency signal, the segmented chirp signal having multiple linearly-ramped chirp segments in each chirp interval.

Each of the foregoing can be employed individually or conjointly, and may include one or more of the following features in any suitable combination: 1. the multiple linearly-ramped chirp segments in each chirp interval have an equal duration, an equal frequency slope, and an equal start frequency. 2. the shift frequency generator includes: multiple quadrature frequency dividers to each provide a shift frequency signal in quadrature, each quadrature frequency divider to provide a different shift frequency; and a multiplexer arrangement to select from said shift frequency signals for each of the multiple chirp segments. 3. the shift frequency generator includes at least one quadrature frequency divider to provide the shift frequency signal in quadrature. 4. the modulator is a single-sideband modulator to produce an up-shifted signal output and a down-shifted signal output for each shift frequency of the shift frequency signal. 5. a switch arrangement to select from the up-shifted and down-shifted signal outputs for each of the multiple chirp segments. 6. outside of the chirp intervals the switch arrangement is configured to isolate the up-shifted and down-shifted signal outputs from a switch output. 7. the chirp segments have equal duration, and wherein the different shift frequencies are integer multiples of a base frequency. 8. a transmitter to generate a transmit signal based on the segmented chirp signal. 9. a receiver to down-convert a receive signal using the segmented chirp signal. 10. signal processing circuitry to derive target range-velocity information based on the receive signal. 11. the segmented chirp signal omits chirp segments during settling intervals of the chirp signal, but the signal processing circuitry is configured to interpolate range-velocity information for the omitted chirp segments.

DETAILED DESCRIPTION

It should be understood that the following description and accompanying drawings are provided for explanatory purposes, not to limit the disclosure. That is, they provide the foundation for one of ordinary skill in the art to understand all modifications, equivalents, and alternatives falling within the scope of the claims. More specifically, though the following description uses vehicles as an illustrative usage context, the disclosed principles and techniques are applicable to other usage contexts such as traffic monitoring, parking spot occupancy detection, and distance measurement.

Figure 1:
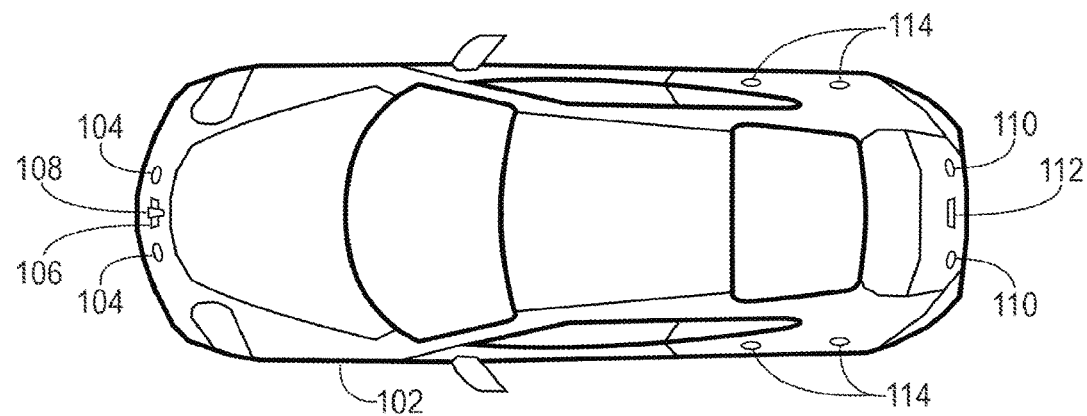
FIG. 1 is an overhead view of an illustrative vehicle equipped with sensors.

FIG. 1 shows an illustrative vehicle 102 equipped with an array of radar antennas, including antennas 104 for short range sensing (e.g., for park assist), antennas 106 for mid-range sensing (e.g., for monitoring stop & go traffic and cut-in events), antennas 108 for long range sensing (e.g., for adaptive cruise control and collision warning), each of which may be placed behind the front bumper cover. Antennas 110 for short range sensing (e.g., for back-up assist) and antennas 112 for mid range sensing (e.g., for rear collision warning) may be placed behind the back bumper cover. Antennas 114 for short range sensing (e.g., for blind spot monitoring and side obstacle detection) may be placed behind the car fenders. Each set of antennas may perform multiple-input multiple-output (MIMO) radar sensing. The type, number, and configuration of sensors in the sensor arrangement for vehicles having driver-assist and self-driving features varies. The vehicle may employ the sensor arrangement for detecting and measuring distances/directions to objects in the various detection zones to enable the vehicle to navigate while avoiding other vehicles and obstacles.

Figure 2:
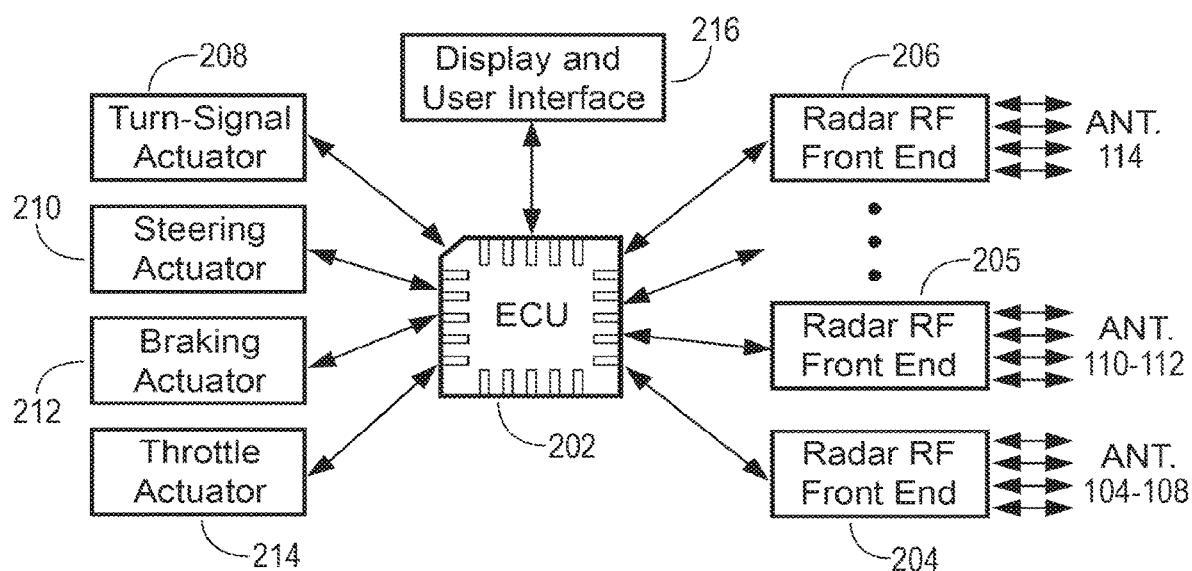
FIG. 2 is a block diagram of an illustrative driver-assistance system.

FIG. 2 shows an electronic control unit (ECU) 202 coupled to the various radar front end devices 204-206 as the center of a star topology. The radar front ends each include mm-wave frequency transceivers which each couple to some of the transmit and receive antennas 104-114 to transmit electromagnetic waves, receive reflections, and optionally to perform processing for determining a spatial relationship of the vehicle to its surroundings. (Such processing may alternatively be performed by the ECU 202.) To provide driver assistance, the ECU 202 may further connect to a set of actuators such as a turn-signal actuator 208, a steering actuator 210, a braking actuator 212, and throttle actuator 214. ECU 202 may further couple to a user-interactive interface 216 to accept user input and provide a display of the various measurements and system status.

Using the interface, sensors, and actuators, ECU 202 may provide automated parking, assisted parking, lane-change assistance, obstacle and blind-spot detection, autonomous driving, and other desirable features. In an automobile, the various sensor measurements are acquired by one or more electronic control units (ECU), and may be used by the ECU to determine the automobile's status. The ECU may further act on the status and incoming information to actuate various signaling and control transducers to adjust and maintain the automobile's operation. Among the operations that may be provided by the ECU are various driver-assist features including automatic parking, lane following, automatic braking, and self-driving.

To gather the necessary measurements, the ECU may employ a MIMO radar system. Radar systems operate by emitting electromagnetic waves which travel outward from the transmit antenna before being reflected back to a receive antenna. The reflector can be any moderately reflective object in the path of the emitted electromagnetic waves. By measuring the travel time of the electromagnetic waves from the transmit antenna to the reflector and back to the receive antenna, the radar system can determine the distance to the reflector. If multiple transmit or receive antennas are used, or if multiple measurements are made at different positions, the radar system can determine the direction to the reflector and hence track the location of the reflector relative to the vehicle. With more sophisticated processing, multiple reflectors can be tracked. At least some radar systems employ array processing to "scan" a directional beam of electromagnetic waves and construct an image of the vehicle's surroundings. Both pulsed and continuous-wave implementations of radar systems can be implemented, though frequency modulated continuous wave radar systems are generally preferred for accuracy.

Figure 3:
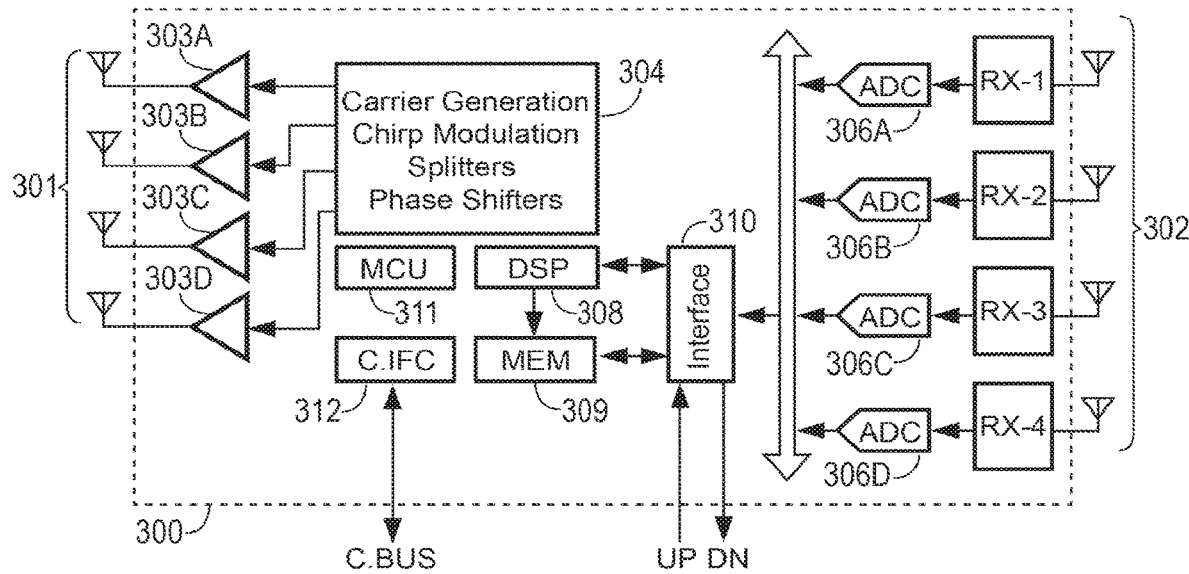
FIG. 3 is a block diagram of an illustrative radar front end device.

FIG. 3 shows a block diagram of an illustrative front end device 300 for a radar system (e.g., devices 204-206 of FIG. 2). Device 300 may be implemented as an integrated circuit on a semiconductor substrate, singulated to form a "chip" and packaged in a standard fashion for mounting on a printed circuit board having traces that connect the device to the antenna elements. Device 300 has antenna feeds or terminals for coupling to an array of transmit antennas 301 and receive antennas 302. Adjustable gain amplifiers 303A-303D drive the transmit antennas 301 with amplified signals from transmitter circuitry 304. Circuitry 304 generates a carrier signal within a programmable frequency band, using a programmable chirp rate and range. The signal generator may employ a phase lock loop with a voltage controlled oscillator and suitable frequency dividers. Splitters and phase shifters derive the transmit signals for the multiple transmitters TX-1 through TX-4 to operate concurrently, and further provide a reference "local oscillator" signal to the receivers for use in the down-conversion process. In the illustrated example, front end device 300 includes 4 transmitters (TX-1 through TX-4) each of which is fixedly coupled to a corresponding transmit antenna 301. In alternative embodiments, multiple transmit antennas are selectably coupled to each of the transmitters.

Front end device 300 further includes 4 receivers (RX-1 through RX-4) each of which is coupled to a receive antenna 302. Four analog to digital converters (ADCs) 306A-306D sample and digitize the down-converted receive signals from the receivers RX-1 through RX-4, supplying the digitized signals to interface 310 for routing to processing logic 308 (such as an embedded digital signal processor (DSP)) for filtering and processing, to embedded memory 309 for buffering, or off-chip for external processing of the digitized baseband signals. Interface logic 310 may take the form of a routing switch or other standard implementation of bridge between the external buses, the internal data bus, and the processor/memory bus.

A microcontroller unit 311 coordinates operations of the various components of front end device 300 based on parameter values set in internal registers. A control interface 312 enables the ECU or other host processor to adjust the parameter values, thereby configuring the operation of each front end device 300, including the transmit signal generation circuitry 304, processing logic 308, and interface logic 310. Embedded memory 309 enables the processing logic 308 and/or interface logic 310 to buffer the digitized signals and any derived target measurement data in accordance with the configuration parameters set via the control interface 312.

As discussed further below, the processing logic 308 may operate on the digitized receive signals to derive target range data, derive target velocity data, derive target angle-of-approach data, and/or to screen out interference and clutter. The screening operation can alternatively be viewed as tentative target detection or separation of target energy from noise energy. Though some radar systems perform such processing in a central location (e.g., the ECU), the contemplated systems may apportion at least some of the processing among the front end devices 204-206.

Figure 4A:
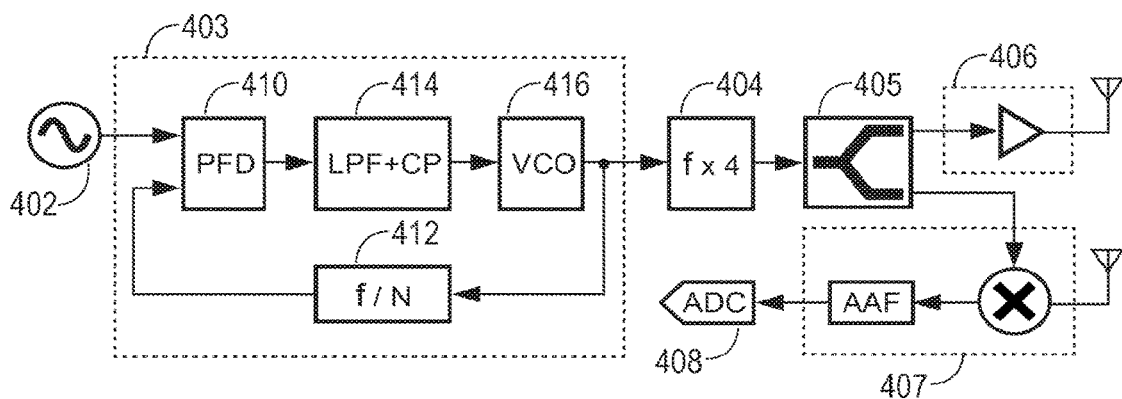
FIG. 4A is a block diagram of an illustrative frequency modulated continuous wave (FMCW) radar transceiver.

The front end device architecture of FIG. 3 can support various operating modes, including that of a frequency modulated continuous wave (FMCW) radar transceiver such as the one shown in FIG. 4A. In the illustrated transceiver, an oscillator 402 generates a reference frequency signal, which a phase lock loop (PLL) 403 converts into a chirp signal. While various suitable techniques exist for chirp signal generation, one potential advantage of PLL-based generation is reduced phase noise which improves measurement signal to noise ratio. With the use of a frequency multiplier 404, the PLL 403 can operate at lower frequencies to further reduce phase noise. A frequency multiplier 404 shifts the chirp signal into the desired frequency range for automotive radar (e.g., 24 GHz or 77 GHz). A power splitter 405 conveys the chirp signal to a transmitter 406 and receiver 407. Though not shown here, additional splitting, switching, and/or modulation may be used for chirp signal distribution in a MIMO radar system.

Transmitter 406 drives one or more transmit antennas with the chirp signal. Receiver 407 filters, amplifies, and down-converts the signal from one or more receive antennas, providing the down-converted signals to an analog-to-digital converter (ADC) 408 for digitization.

PLL 403 includes a phase frequency detector (PFD) 410 that derives a phase error signal by comparing the phase of the reference frequency signal with the phase of a feedback signal from frequency divider 412. A charge pump and a loop filter 414 convert the phase error signal to a control signal for a voltage-controlled oscillator (VCO) 416, raising the VCO output signal frequency when the feedback signal phase lags the reference frequency signal phase and lowering the VCO output signal frequency when the feedback signal phase leads. The frequency divider 412 derives the feedback signal from the VCO output signal by dividing the output signal frequency by an adjustable divisor N. PLL 403 may use a sigma-delta modulator to alternate values of N at a rate much higher than the PLL bandwidth, providing a mean value of N that can take on fractional (non-integer) values.

Figure 4B:
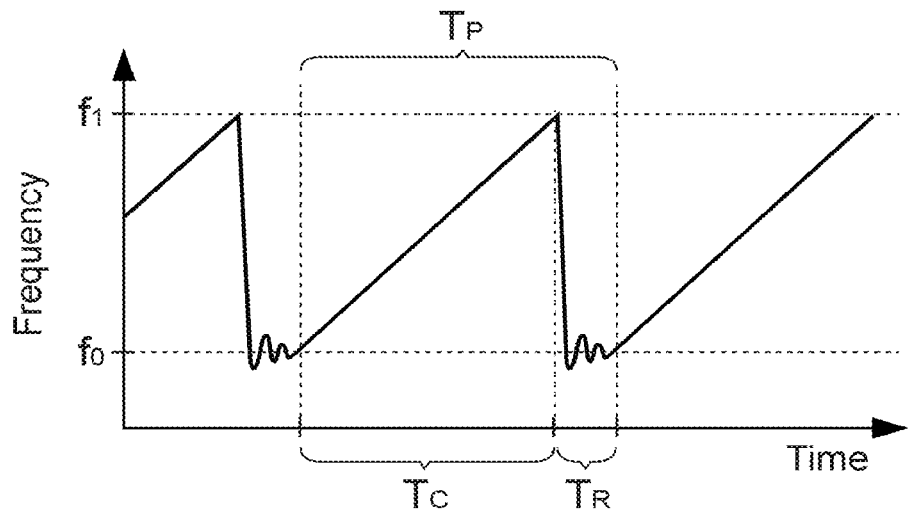
FIG. 4B is a graph of an illustrative chirp signal.

To generate a chirp, PLL 403 slowly varies the mean value of N to sweep the output signal frequency in a linear fashion from a low frequency $f_0$ to a high frequency $f_1$ (as shown in FIG. 4B) or vice versa. The chirp waveform shown in FIG. 4B repeats once every measurement period $T_P$. The sudden control signal transient causes an interval of instability while the PLL resettles, which is here termed a resettling interval $T_R$. The resettling interval $T_R$ is followed by a chirp interval Tc during which the frequency increases linearly with a programmable slope m.

A potential concern with the chirp waveform of FIG. 4B is the limit imposed on the measurement rate by the resettling interval $T_R$. Decreases to the measurement period $T_P$ are not accompanied by corresponding decreases to the resettling interval $T_R$, limiting the improvements in measurement resolution that could otherwise be achieved with faster measurements.

Figure 5A:
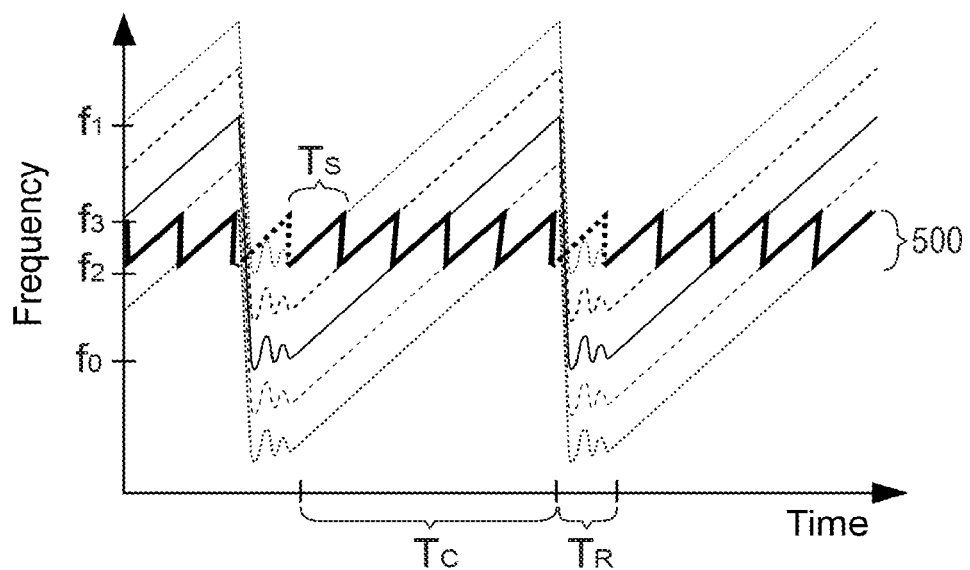
FIG. 5A is a graph of an illustrative segmented chirp signal formed from a set of frequency-shifted chirp signals.

To address this potential concern, FIG. 5A shows the chirp waveform of FIG. 4B along with four versions that have been frequency shifted by $-2f_B$, $-1f_B$, $+1f_B$, and $+2f_B$, where $f_B$ is a base shift frequency. With suitable switching between the chirp waveform and its frequency shifted versions, a radar transceiver device can generate a segmented chirp signal 500 having essentially no delay between the chirp segments $T_S$. (The time required to switch between frequency shifts may be less than one sampling period of the ADC.) With suitable adjustment of the chirp waveform slope and/or the segment interval size, the chirp interval is segmented into a whole number of identical chirp segments. During the resettling interval $T_R$, the segmented chirp signal may be suppressed.

The original chirp spans a frequency range $f_0$ to $f_1$, while each chirp segment spans a frequency range $f_2$ to $f_3$. Note the base shift frequency $f_B$ limits the frequency range of each chirp segment.

Figure 5B:
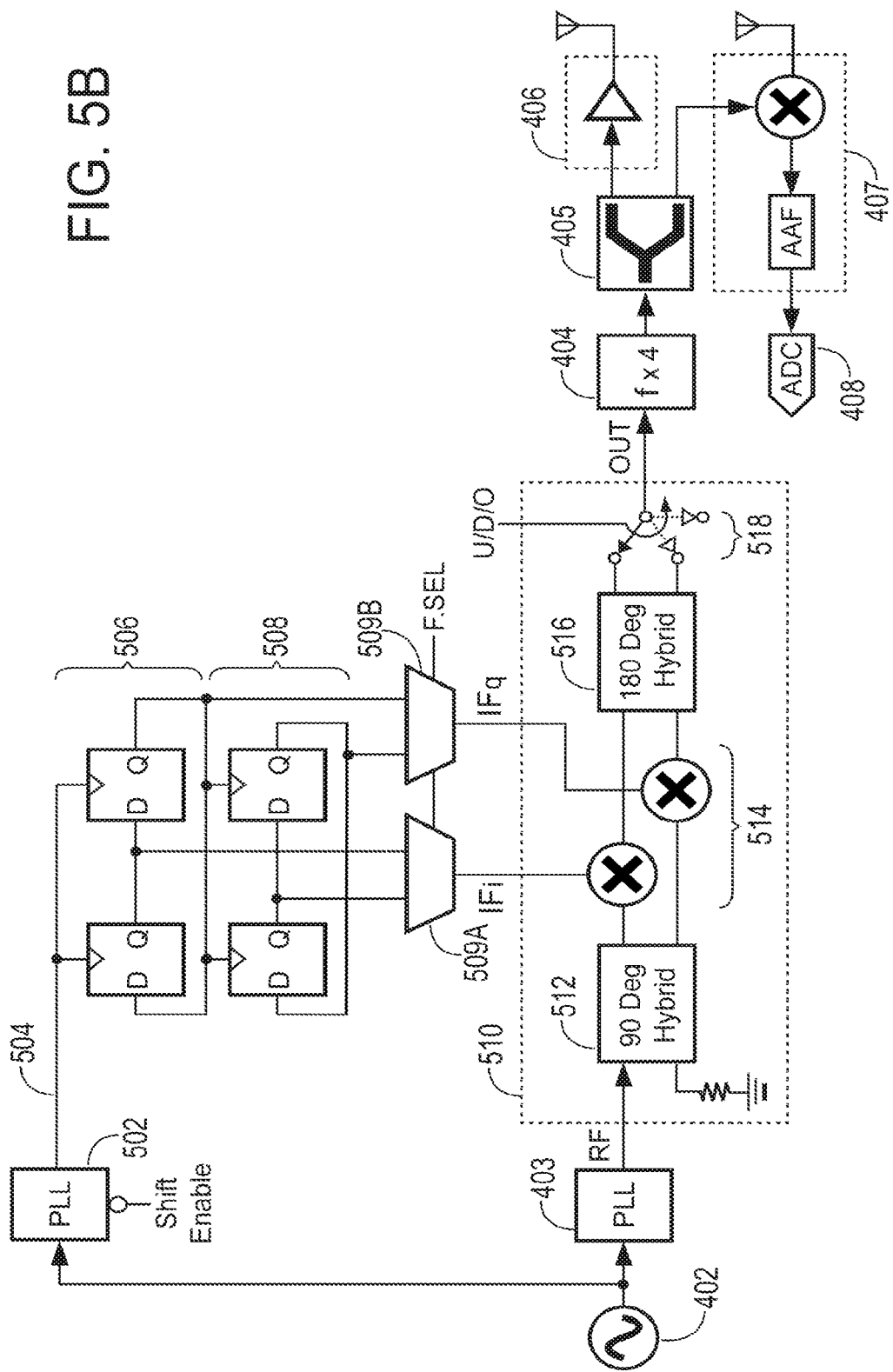
FIG. 5B is an illustrative segmented chirp radar transceiver.

The illustrative transceiver of FIG. 5B includes the elements of FIG. 4A, and further includes a PLL 502 to multiply a frequency reference signal (such as that provided by oscillator 402) to a desired multiple of the base shift frequency $f_B$. For the present example, the clock signal 504 produced by PLL 502 is $4f_B$. A first set of flip flops 506 forms a first quadrature frequency divider that converts clock signal 504 into two frequency shift signals (an in-phase signal for multiplexer 509A and a quadrature-phase signal for multiplexer 509B) each having a frequency of $2f_B$. A second set of flip flops 508 forms a second quadrature frequency divider that converts one of the $2f_B$ frequency shift signals into two more frequency shift signals (another in-phase signal for multiplexer 509A and another quadrature phase signal for multiplexer 509B) each having a frequency of $f_B$. The multiplexers 509A,B pass either the $f_B$ frequency shift signals or the $2f_B$ frequency shift signals to a single sideband modulator (SSM) 510 based on a frequency selection signal F.SEL. Low pass filters 511 are provided to prevent square wave harmonics of the frequency shift signals from entering the SSM 510.

Note that when PLL 502 is disabled, the frequency shift signals are constant valued (frequency of zero). Where it is desired to keep PLL 502 operating, the frequency shift signal can also be suppress by, for example, disabling the flip flops in the first or second quadrature frequency dividers, or as another example, by adding an enable bit to multiplexers 509A, 509B to drive their output low when disabled.

SSM 510 includes a 90 degree hybrid circuit 512 that splits the chirp signal from PLL 403 into two chirp signals that are 90 degrees out of phase, i.e., "in quadrature". Mixers 514 combine the in-phase chirp signal with the selected in-phase frequency shift signal to produce a first product signal, and combine the quadrature-phase chirp signal with the selected quadrature-phase frequency shift signal to produce a second product signal. A 180 degree hybrid circuit 516 combines the product signals to produce a sum-of-products signal in which the chirp signal has been up-shifted in frequency by the frequency of the frequency shift signal, and to produce a difference-of-products signal in which chirp signal has been down-shifted by the same amount. A switch arrangement 518 selects either the up-shifted signal, the down-shifted signal, or isolates both signals from the output. With different combinations of the shift control signals (i.e., shift enable signal, frequency select signal, and the up/down/off switch control signal), the illustrative transceiver can select the chirp signal shifted by $-2f_B$, $-f_B$, 0, $f_B$, $2f_B$, or block the chirp signal entirely. The microcontroller unit 311 may configure the timing of the shift control signals relative to the original chirp signal timing to provide the desired number of chirp segments in each chirp interval.

Figure 5C:
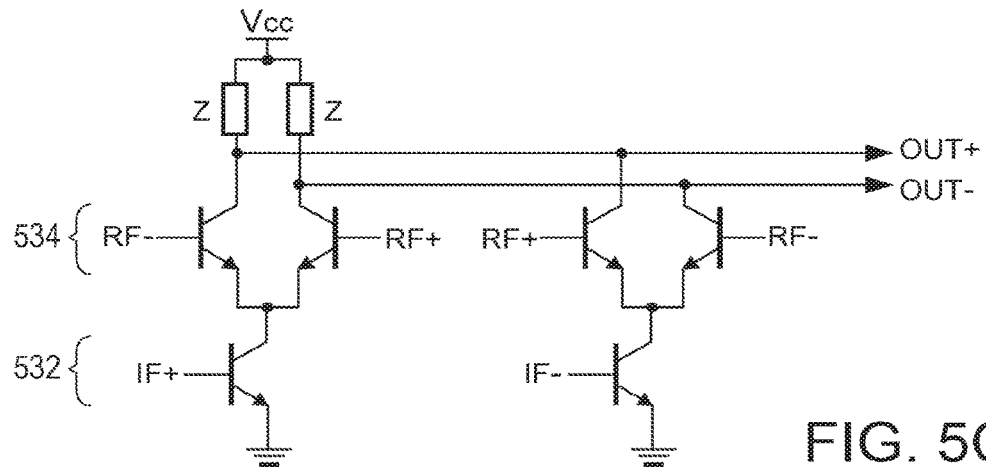
FIG. 5C is a schematic of an illustrative mixer.

FIG. 5C is a circuit schematic of an illustrative mixer 514, which includes a pair of transconductance transistors 532 each biasing a differential pair of switching transistors 534. (The illustrated transistors are NPN bipolar junction transistors, but other transistor implementations would also be suitable.) The differential pairs couple in parallel to differential output traces OUT+, OUT−, which are individually coupled to a supply voltage VCC via a bias impedance Z. In the illustrated "upconversion" configuration, the shift frequency signal is supplied in differential signal form IF+, IF−, to the bases of the pair of transconductance transistors 532, while the chirp signal is supplied in differential signal form RF+, RF− to the bases of each differential pair of switching transistors 534. Another suitable configuration, herein termed the "modulator" configuration, supplies the chirp signal in differential form to the bases of the pair of transconductance transistors 532, and the shift frequency signal to the bases of each differential pair of switching transistors 534. In each case, the mixer output is the product of the chirp signal with the shift frequency signal.

Figure 6A:
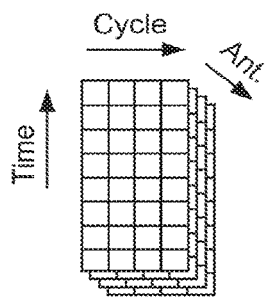
FIG. 6A is a first illustrative data cube representing a set of radar measurements.

FIG. 6A shows an illustrative data cube representing a portion of the digital signal measurements that may be collected by a given front end device using segmented chirp signal transmission. Each chirp segment (one-way traversal of the frequency range) may be considered as a measurement cycle. During a measurement cycle, the front end digitizes the down-converted receive signals from the selected receive antennas, thereby providing a time-sequence of digitized receive signal samples. Due to the chirp modulation, the signal energy reflected by the targets reaches the receive antennas with a frequency offset that depends on the round-trip travel time (and hence on the distance to the target). A Fast Fourier Transform (FFT) of the time sequence collected in a given cycle will isolate the energy associated with each frequency offset, yielding a function of reflected energy versus target range. This operation, which may be referred to herein as the "range FFT", may be performed for each antenna in each measurement cycle. The range FFT yields peaks for each target having a given range.

Motion of the target relative to the antenna array adds a Doppler shift to the reflected signal energy, the Doppler shift being essentially proportional to the relative velocity. Though it is usually small relative to the range-induced frequency offset, it is nevertheless observable as a change in the phase of the associated frequency coefficients in subsequent measurement cycles. (Recall that FFT coefficients are complex-valued, having both magnitude and phase.) Applying an FFT to the corresponding frequency coefficients in a sequence of measurement cycles will isolate the energy associated with each relative velocity, yielding a function of reflected energy versus target velocity. This operation, which may be referred to herein as the "velocity FFT", may be performed for each range and each antenna. The resulting two-dimensional data array possesses "peaks" for each target having a given range and relative velocity.

The reflected energy from a given target reaches the individual receive antennas in the antenna array with a phase that depends on the direction of arrival of the reflected energy (aka "angle of approach"). Applying an FFT to corresponding frequency coefficients associated with a sequence of uniformly spaced antennas will isolate the energy associated with each incidence angle, yielding a function of reflected energy versus angle of approach ("AoA"). This operation, which may be referred to herein as the "AoA FFT", may be performed for each range and velocity.

Figure 6B:
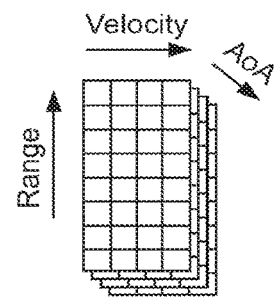
FIG. 6B is a second illustrative data cube representing a transformed set of radar measurements.

Thus, digitized signal measurements arranged in a measurement data cube having its three dimensions representing functions of time, measurement cycle, and antenna position (as shown in FIG. 6A), can be transformed into a target data cube having its three dimensions representing functions of range, velocity, and AoA (as shown in FIG. 6B). As FFTs are linear, the range FFT, velocity FFT, and AoA FFT can be performed in any order. Further, the FFT operations are independent (meaning that, e.g., the range FFT for a given antenna and cycle is independent of the range FFTs for other antennas and other cycles, and the velocity FFT for a given range and antenna is independent of the velocity FFTs for other ranges and antennas) enabling the FFT processing to be parallelized if desired.

Another desirable processing operation is the separation of signal energy from noise energy. Any suitable noise suppression or target detection technique may be used. One popular technique (which includes many variants) is that of constant false alarm rate (CFAR) detection. CFAR detection employs detection threshold adaptation based on measurement energy values in a sliding window near or around the measurement being evaluated (aka "cell under test"). The original technique and its variations offer various tradeoffs between performance and computational complexity by using different statistical approaches to deriving the detection threshold from the measurements within the sliding window. CFAR detection is a non-linear technique because the measurements values below the threshold are zeroed or ignored, but its position in the processing sequence may nevertheless be modified because the zeroing of frequency coefficients generally will not prevent subsequent FFTs from exploiting the relevant phase/frequency information of energy peaks representing targets.

Figure 7:
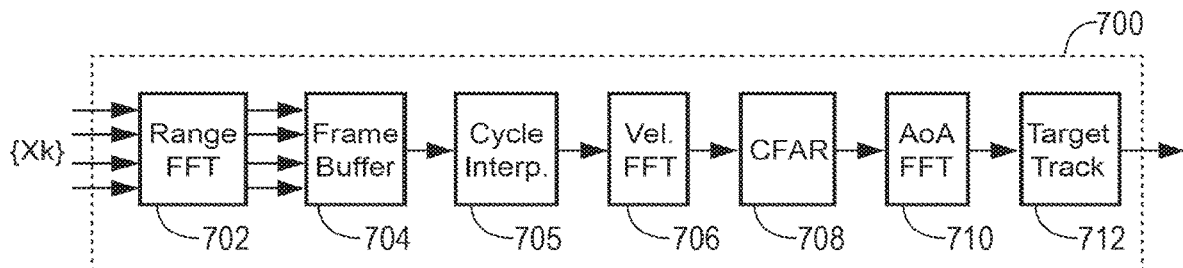
FIG. 7 is a data flow diagram for an illustrative radar system.

FIG. 7 shows an illustrative data flow that may be implemented by each front end device 300 or split between the front end devices and the ECU. The processing logic 308 may perform range FFTs 702 on the digitized receive signals $x_k$ from each antenna essentially as the signals are acquired, storing the resulting frequency coefficients as range data in a frame buffer 704 in memory 309. The frame buffer 704 accumulates range data from multiple measurement cycles, enabling the processing logic 308 to perform velocity FFTs 706 to produce target range and velocity data for each antenna as discussed previously. Note, however, that the segmented chirp signal is suppressed during the resettling interval. Where the segmented chirp signal has K chirp segments per chirp interval of the original chirp signal, this suppression means that the data cube of FIG. 6A lacks measurements for every (K+1)th cycle. Interpolation 705 can be used to replace the missing measurement cycles with interpolated measurement values before the velocity FFT 706 is performed.

A CFAR detector 708 operates on the target range and velocity data to remove noise energy below the adaptive threshold. The CFAR detector 708 may zero the below-threshold values, leaving only the above-threshold values as representing range and velocity of potential targets (radar energy reflectors). In certain contemplated variations, the CFAR detection process compresses the volume of data by omitting at least some of the below-threshold values, and by perhaps employing a more sophisticated data compression technique to reduce buffer size requirements and/or bus bandwidth requirements. The processing circuitry 308 or the ECU 202 may further perform AoA FFTs 710 to determine the relative directions associated with potential targets, and analyze any peaks in the data volume to detect and track 712 the relative position and velocities of targets relative to the vehicle.

Figure 8:
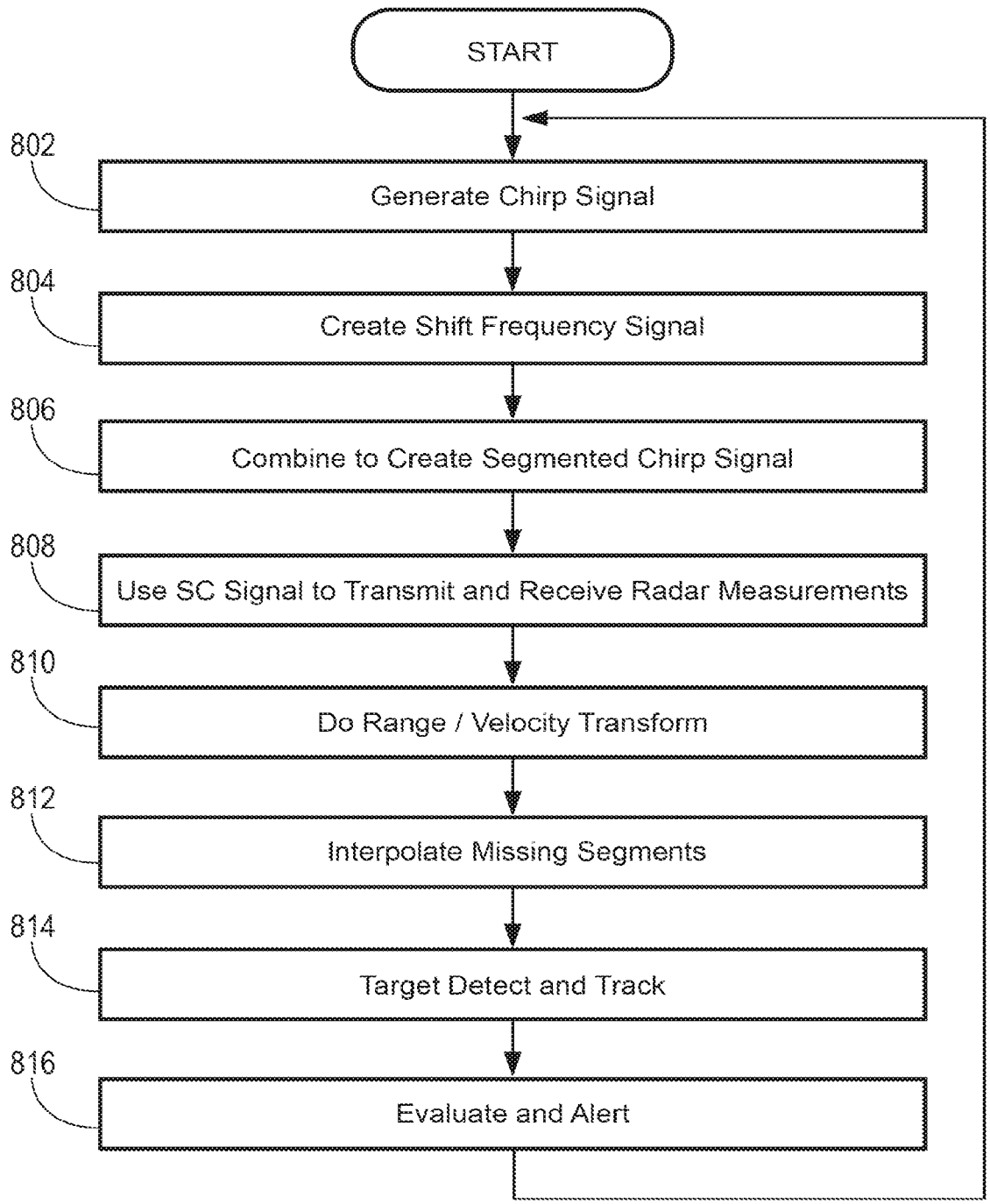
FIG. 8 is a flow chart of an illustrative radar detection method.

FIG. 8 is a flow chart of an illustrative radar detection method implementable by the front end device. It begins in block 802 using a chirp generator, e.g., a PLL 403, to generate a chirp signal having intervals where the signal frequency ramps linearly from a start frequency to an end frequency. The chirp signal can be an upward-chirp, a downward chirp, or even a triangular up-then-down chirp signal. In block 804, the device generates a shift frequency signal having multiple segments for each chirp interval, with each segment having a different shift frequency. In block 806, the device combines the chirp signal with the shift frequency signal to obtain a segmented chirp signal with linear frequency ramps in each segment.

In block 808, the device derives a transmit signal from the segmented chirp signal, and combines one or more receive signals with the segmented chirp signal to obtain multiple measurement cycles in each chirp interval of the original chirp signal. In block 810, the device digitizes and transforms the down-converted receive signal to obtain range-velocity information of any reflectors. In block 812, the device uses interpolation to replace any missing measurement cycles associated with resettling intervals of the original chirp signal. In block 814, the device (or ECU) detects and tracks potential targets. In block 816, the device (or ECU) evaluates the target information and alerts the user as needed, optionally performing automated actions to avoid collisions.

Though the operations in FIG. 8 have been described in a sequential fashion for explanatory purposes, the various operations may in practice be implemented in a concurrent or pipelined fashion. Moreover, the operations may be re-ordered or performed asynchronously in some implementations. Numerous other modifications, equivalents, and alternatives, will become apparent to those of ordinary skill in the art once the above disclosure is fully appreciated. It is intended that the following claims be interpreted to embrace all such modifications, equivalents, and alternatives where applicable.

What is claimed is:

1. An integrated circuit that comprises:
   a chirp generator configured to provide a chirp signal having linearly-ramped chirp intervals;
   a shift frequency generator configured to provide shift frequency signals having different shift frequencies during each of multiple segments in each chirp interval; and
   a modulator configured to provide a segmented chirp signal based at least in part on the chirp signal and the shift frequency signals, the segmented chirp signal having multiple linearly-ramped chirp segments in each chirp interval, wherein the multiple linearly-ramped chirp segments in the segmented chirp signal comprise a saw-tooth pattern, and
   wherein a delay between adjacent linearly-ramped chirp segments is less than a sample period in a digital domain in the integrated circuit.

2. The integrated circuit of claim 1, wherein the multiple linearly-ramped chirp segments in each chirp interval have an equal duration, an equal frequency slope, and an equal start frequency.

3. The integrated circuit of claim 1, wherein the shift frequency generator comprises:
   multiple quadrature frequency dividers configured to each provide a shift frequency signal in quadrature, each quadrature frequency divider configured to provide a different shift frequency; and
   a multiplexer arrangement configured to select from the shift frequency signals for each of the multiple chirp segments.

4. The integrated circuit of claim 1, wherein the shift frequency generator comprises at least one quadrature frequency divider configured to provide the shift frequency signals in quadrature.

5. The integrated circuit of claim 4, wherein the modulator is a single-sideband modulator configured to produce an up-shifted signal output and a down-shifted signal output for each shift frequency of the shift frequency signals.

6. The integrated circuit of claim 5, further comprising a switch arrangement configured to select from the up-shifted and down-shifted signal outputs for each of the multiple chirp segments.

7. The integrated circuit of claim 6, wherein outside of the chirp intervals the switch arrangement is configured to isolate the up-shifted and down-shifted signal outputs from a switch output.

8. The integrated circuit of claim 1, wherein the chirp segments have equal duration, and wherein the different shift frequencies are integer multiples of a base frequency.

9. The integrated circuit of claim 1, further comprising:
   a transmitter configured to generate a transmit signal based at least in part on the segmented chirp signal;
   a receiver configured to down-convert a receive signal using the segmented chirp signal; and
   signal processing circuitry configured to derive target range-velocity information based at least in part on the receive signal.

10. The integrated circuit of claim 9, wherein the segmented chirp signal omits chirp segments during settling intervals of the chirp signal, and wherein processing circuitry is configured to interpolate range-velocity information for the omitted chirp segments.

11. A method that comprises:
    by an integrated circuit:
    generating a chirp signal having linearly-ramped chirp intervals;
    generating shift frequency signals having different shift frequencies during each of multiple segments in each chirp interval; and
    providing a segmented chirp signal based at least in part on the chirp signal and the shift frequency signals, the segmented chirp signal having multiple linearly-ramped chirp segments in each chirp interval, wherein the multiple linearly-ramped chirp segments in the segmented chirp signal comprise a saw-tooth pattern, and
    wherein a delay between adjacent linearly-ramped chirp segments is less than a sample period in a digital domain in the integrated circuit.

12. The method of claim 11, wherein the generating the shift frequency signals comprises:
    using multiple quadrature frequency dividers that each provide a shift frequency signal in quadrature, each quadrature frequency divider providing a different shift frequency; and
    select from the shift frequency signals for each of the multiple chirp segments.

13. The method of claim 11, wherein the providing uses a single-sideband modulator that produces an up-shifted signal output and a down-shifted signal output for each shift frequency of the shift frequency signals.

14. The method of claim 13, wherein the providing comprises selecting from the up-shifted and down-shifted signal outputs for each of the multiple chirp segments.

15. The method of claim 11, wherein the chirp segments have equal duration, and wherein the different shift frequencies are integer multiples of a base frequency.

16. The method of claim 11, further comprising:
    generating a transmit signal based at least in part on the segmented chirp signal;
    down-converting a receive signal using the segmented chirp signal; and
    deriving target range-velocity information based at least in part on the receive signal.

17. The method of claim 16, wherein the segmented chirp signal omits chirp segments during settling intervals of the chirp signal, and wherein the deriving target range-velocity information comprises interpolating range-velocity information for the omitted chirp segments.

18. A radar device that comprises:
    a chirp generator configured to provide a chirp signal having linearly-ramped chirp intervals;
    a shift frequency signal generator configured to provide shift frequency signals having different shift frequencies during each of multiple segments in each chirp interval; and
    a modulator configured to provide a segmented chirp signal based at least in part on the chirp signal with the shift frequency signals, the segmented chirp signal having multiple linearly-ramped chirp segments in each chirp interval, wherein the multiple linearly-ramped chirp segments in the segmented chirp signal comprise a saw-tooth pattern, and wherein a delay between adjacent linearly-ramped chirp segments is less than a sample period in a digital domain in the radar device.

19. The radar device of claim 18, wherein the multiple linearly-ramped chirp segments in each chirp interval have an equal duration, an equal frequency slope, and an equal start frequency.

20. The radar device of claim 18, further comprising:
a transmitter configured to generate a transmit signal based at least in part on the segmented chirp signal;
a receiver configured to down-convert a receive signal using the segmented chirp signal; and
signal processing circuitry configured to derive target range-velocity information based at least in part on the receive signal.

\* \* \* \* \*